United States Patent [19]

Dunn, III et al.

[11] 3,884,558

[45] May 20, 1975

[54] STABILIZED THERMALLY COMPENSATED MIRROR

[75] Inventors: Charlton Dunn, III, Chatsworth; Ronald D. Tobin, Newbury Park; Neil E. Bergstreser, Canoga Park; Theodore A. Heinz, Moorpark, all of Calif.

[73] Assignee: Rockwell International Corporation, El Segundo, Calif.

[22] Filed: July 3, 1972

[21] Appl. No.: 269,674

[52] U.S. Cl. .............................. 350/288; 350/310
[51] Int. Cl. .............................................. G02b 5/08
[58] Field of Search ........ 350/310, 288; 331/94.5 T, 331/94.5 C, 94.5 D

[56] References Cited
UNITED STATES PATENTS

| | | | |
|---|---|---|---|
| 3,489,484 | 1/1970 | Brown | 350/310 |
| 3,582,190 | 6/1971 | Smith | 350/310 |
| 3,637,296 | 1/1972 | McLafferty et al. | 350/310 |
| 3,708,223 | 1/1973 | Sorenson et al. | 350/310 |
| 3,731,992 | 5/1973 | Mansell | 350/310 |

*Primary Examiner*—Maynard R. Wilbur
*Assistant Examiner*—G. E. Montone
*Attorney, Agent, or Firm*—L. Lee Humphries; Robert M. Sperry

[57] ABSTRACT

A thermally compensated mirror formed by a laminated structure comprising a front plate having a reflective front surface and having a plurality of grooves formed in the rear surface for conducting coolant fluid in heat exchanging relation with said reflective surface, a rear plate having coolant inlet and coolant outlet openings extending therethrough, a minimum temperature plate interposed between said front and rear plates and formed with a plurality of coolant distribution passageways coupled to receive coolant fluid from said coolant inlet and oriented to distribute said coolant fluid in a manner to establish a minimum temperature plane parallel to said reflective surface, a temperature stabilization plate interposed between said front plate and said minimum temperature plate and formed with a plurality of coolant distribution channels coupled to receive said coolant fluid after said coolant fluid has passed in heat exchanging relation with said reflective surface and oriented to distribute said coolant fluid in a manner to establish a uniform temperature plane parallel to said reflective surface, and means for circulating said coolant fluid through said structure in a predetermined path.

4 Claims, 2 Drawing Figures

STABILIZED THERMALLY COMPENSATED MIRROR

BACKGROUND OF THE INVENTION

1. Field of the Invention

This invention relates to optical mirrors and is particularly directed to a thermally compensated mirror having means for compensating for nonuniform optical load distribution.

2. Prior Art

Optical mirrors, particularly when used in conjunction with lasers, are frequently subjected to extreme thermal loads. In some instances, the thermal loads have been sufficient to melt or otherwise damage or destroy the reflective surface of the mirror. To overcome these problems, it has been proposed to construct optical mirrors in a manner such as to permit circulation of coolant fluids in heat exchanging relation with the reflective surface. Unfortunately, with the mirror designs of the prior art, the introduction of such coolant fluids has produced thermal stresses which have caused distortion of the mirrors. This distortion requires readjustment of the mirror and, in many cases, renders the mirror useless for the intended purpose.

Numerous attempts have been made heretofore to overcome these problems. However, none of the prior art techniques have been entirely satisfactory. Thus, it has been found that the laser energy is often unevenly distributed across the reflective surface of the mirror, which causes localized heating. This uneven heat distribution can be passed through the mirror structure and can produce distortion even in cooled mirrors.

BRIEF SUMMARY AND OBJECTS OF INVENTION

These disadvantages of the prior art are overcome with the present invention and a cooling system for optical mirrors is proposed which compensates for nonuniform heating and which efficiently cools the mirror structure in a manner so as to minimize thermal distortion.

The advantages of the present invention are preferably attained by providing a laminated mirror structure comprising a front plate having a reflective front surface and having a plurality of grooves formed in the rear surface for conducting coolant fluid in heat exchanging relation with said reflective surface, a rear plate having coolant inlet and coolant outlet openings extending therethrough, a minimum temperature plate interposed between said front and rear plates and formed with a plurality of coolant distribution passageways coupled to receive coolant fluid from said coolant inlet and oriented to distribute said coolant fluid in a manner to establish a minimum temperature plane parallel to said reflective surface, a temperature stabilization plate interposed between said front plate and said minimum temperature plate and formed with a plurality of coolant distribution channels coupled to receive said coolant fluid after said coolant fluid has passed in heat exchanging relation with said reflective surface and oriented to distribute said coolant fluid in a manner to establish a uniform temperature plane parallel to said reflective surface, and means for circulating said coolant fluid through said structure in a predetermined path.

Accordingly, it is an object of the present invention to provide improved optical mirrors.

Another object of the present invention is to provide an improved cooling system for optical mirrors.

An additional object of the present invention is to provide means for minimizing thermal distortion of optical mirrors.

A further object of the present invention is to provide means for compensating optical mirrors for uneven distribution of thermal loads.

A specific object of the present invention is to provide a laminated mirror structure comprising a front plate having a reflective front surface and having a plurality of grooves formed in the rear surface for conducting coolant fluid in heat exchanging relation with said reflective surface, a rear plate having coolant inlet and coolant outlet openings extending therethrough, a minimum temperature plate interposed between said front and rear plates and formed with a plurality of coolant distribution passageways coupled to receive coolant fluid from said coolant inlet and oriented to distribute said coolant fluid in a manner to establish a minimum temperature plane parallel to said reflective surface, a temperature stabilization plate interposed between said front plate and said minimum temperature plate and formed with a plurality of coolant distribution channels coupled to receive said coolant fluid after said coolant fluid has passed in heat exchanging relation with said reflective surface and oriented to distribute said coolant fluid in a manner to establish a uniform temperature plane parallel to said reflective surface, and means for circulating said coolant fluid through said structure in a predetermined path.

These and other objects and features of the present invention will be apparent from the following detailed description, taken with reference to the accompanying drawing.

DETAILED DESCRIPTION OF ILLUSTRATED EMBODIMENT

Figure 1:
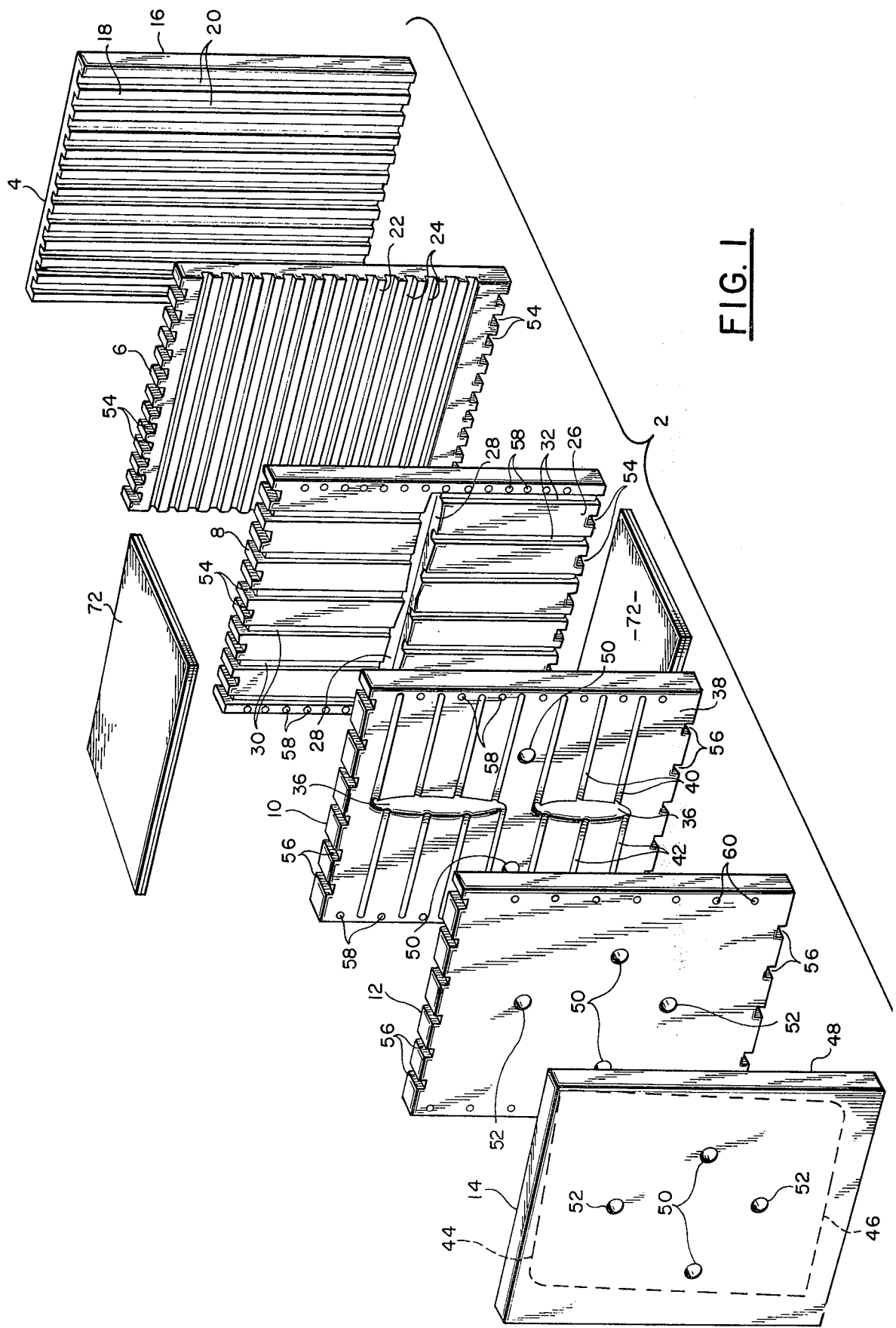
FIG. 1 is an exploded isometric rear view of a mirror embodying the present invention.

In that form of the present invention chosen for purposes of illustration, FIG. 1 shows an optical mirror structure, indicated generally at 2, comprising a plurality of plates 4, 6, 8, 10, 12 and 14 which are bonded together, by any suitable bonding technique, to form a laminated structure. The front plate 4 has its front face 16 polished or coated to provide a reflective surface, while the rear face 18 is formed with a plurality of grooves 20 which extend completely across the rear face 18 and cooperate with the adjacent surface of plate 6 to form conduits for conducting coolant fluid in heat exchanging relation with the reflective front face 16. Plate 6 is a temperature stabilization plate having its rear surface 22 formed with a plurality of grooves 24 which extend completely across plate 6 and are preferably oriented perpendicularly to the grooves 20 of front plate 4. Plate 8 is a minimum temperature plate and has its rear surface 26 formed with a pair of relatively large, generally elliptical grooves 28 which extend in opposite directions from the center of the rear face 26 and which each communicate with two groups of smaller grooves 30 and 32 extending oppositely to each other and perpendicular to the grooves 28 across the rear surface 26 of plate 8. Preferably, the grooves of groups 30 and 32 extend parallel to the grooves 20 of front plate 4 and are spaced apart a distance equal to twice the spacing of the grooves 20 of front plate 4. Moreover, the grooves of group 30 are offset from the grooves of group 32 so that the grooves of each group 30 or 32 extend oppositely from the space between the adjacent grooves of the other group 32 or 30. Plate 10 is an outlet manifold plate formed with a pair of relatively large, generally elliptical grooves 36 which extend in opposite directions from the center of the rear face 38 which each communicates with two groups of smaller grooves 40 and 42 extending oppositely to each other and perpendicular to the grooves 36 across the rear face 38 of plate 10. Preferably, the grooves of groups 40 and 42 extend parallel to the grooves 24 of plate 6 and are spaced apart a distance equal to twice the spacing of the grooves 24 of plate 6. Moreover, the grooves of group 40 are offset from the grooves of group 42 so that the grooves of each group 40 or 42 extend oppositely from the space between the adjacent grooves of the other group 42 or 40. Plate 12 is simply a closure plate which cooperates with the grooves of plates 10 and 14 to form passageways for circulating the coolant fluid. Rear plate 14 has two generally L-shaped grooves 44 and 46 formed on its front surface 48. As shown, groove 44 extends along the top and one side of surface 48, while groove 46 extends along the bottom and the opposite side of surface 48. Fluid inlet openings 50 are formed in plates 14, 12, and 10, and communicate with the grooves 28 in plate 8. Similarly, fluid outlet openings 52 are formed in plates 14 and 12 and communicate with the grooves 36 in plate 10. The upper and lower edges of plates 6 and 8 are formed with a plurality of recesses 54 equal in number to the number of grooves 20 in plate 4 and communicating therewith. As indicated above, the grooves of groups 30 and 32 of plate 8 are spaced apart twice the distance between the grooves 20 of plate 4 and, hence, communicate with alternate ones of the recesses 54. The upper and lower edges of plates 10 and 12 are formed with recesses 56 which are spaced apart twice the distance between the recesses 54 and which communicate the recesses 44 and 46 of plate 14 with the intermediate recesses 54 which do not communicate with the grooves of groups 30 and 32 of plate 8. Along the sides of plates 8 and 10 are provided rows of openings 58 equal in number to and communicating with the grooves 24 of plate 6. Alternate ones of the holes 58 communicate with the grooves of groups 40 and 42 of plate 10. The sides of plate 12 are also provided with rows of openings 60 at twice the spacing of the openings 58 and communicate the recesses 44 and 46 of plate 14 with the intermediate openings 58 which do not communicate with the grooves of groups 40 and 42 of plate 10. The plates 4, 6, 8, 10, 12 and 14 are bonded together, by any suitable bonding technique, to form a unitary structure and cover plates 72 are bonded to the top and bottom of the structure and cooperate with the recesses 54 and 56 to form conduits for circulating the coolant fluid.

In use, the coolant fluid is supplied through inlet openings 50 in plates 14, 12, and 10 to the grooves 28 of plate 8 and passes through the grooves of groups 30 and 32 of plate 8 and the alternate recesses 54 to the grooves 20 of plate 4 to flow in heat exchanging relation with the reflective surface 16 of plate 4. Because of the alternate orientation of the grooves of groups 30 and 32 of plate 8, it will be seen that coolant fluid flowing through the grooves of group 30 will flow through the alternate recesses 54 in the upper edges of plates 8 and 6 into alternate ones of the grooves 20 of plate 4 in heat exchanging relation with the reflective surface 16 and, thence, into the intermediate recesses 54 in the lower edges of plates 6 and 8 and through the recesses 56 in the lower edges of plates 10 and 12 into groove 46 of plate 14. Similarly, coolant fluid flowing through the grooves of group 32 of plate 8 will flow through the alternate recesses 54 in the lower edges of plates 8 and 6 into the intermediate ones of the grooves 20 of plate 4 in heat exchanging relation with the reflective surface 16 and, thence, into the intermediate recesses 54 in the upper edges of plates 6 and 8 through the recesses 56 in the upper edges of plates 10 and 12 into groove 44 of plate 14. From plate 14, the fluid in groove 44 will flow through the openings 60 in one side of plate 12 and through those openings 58 of plates 10 and 8 which are intermediate the grooves of group 40 of plate 10 into alternate ones of the grooves 24 of plate 6 and, thence, through those openings 58 on the opposite side of plates 8 and 10 which communicate into the grooves of group 42 of plate 10. Thereafter, the coolant is exhausted through grooves 36 of plate 10 and the coolant outlet openings 52 in plates 12 and 14. Similarly, the fluid in groove 46 of plate 14 will flow through the openings 60 in the opposite side of plate 12 and through those openings 58 of plates 10 and 8 which are intermediate the grooves of group 42 of plate 10 into the intermediate grooves 24 of plate 6 and, thence, through those openings 58 in plates 8 and 10 which communicate with the grooves of group 40 of plate 10. Thereafter, the coolant is exhausted through grooves 36 of plate 10 and the coolant outlet openings 52 in plates 12 and 14.

Figure 2:
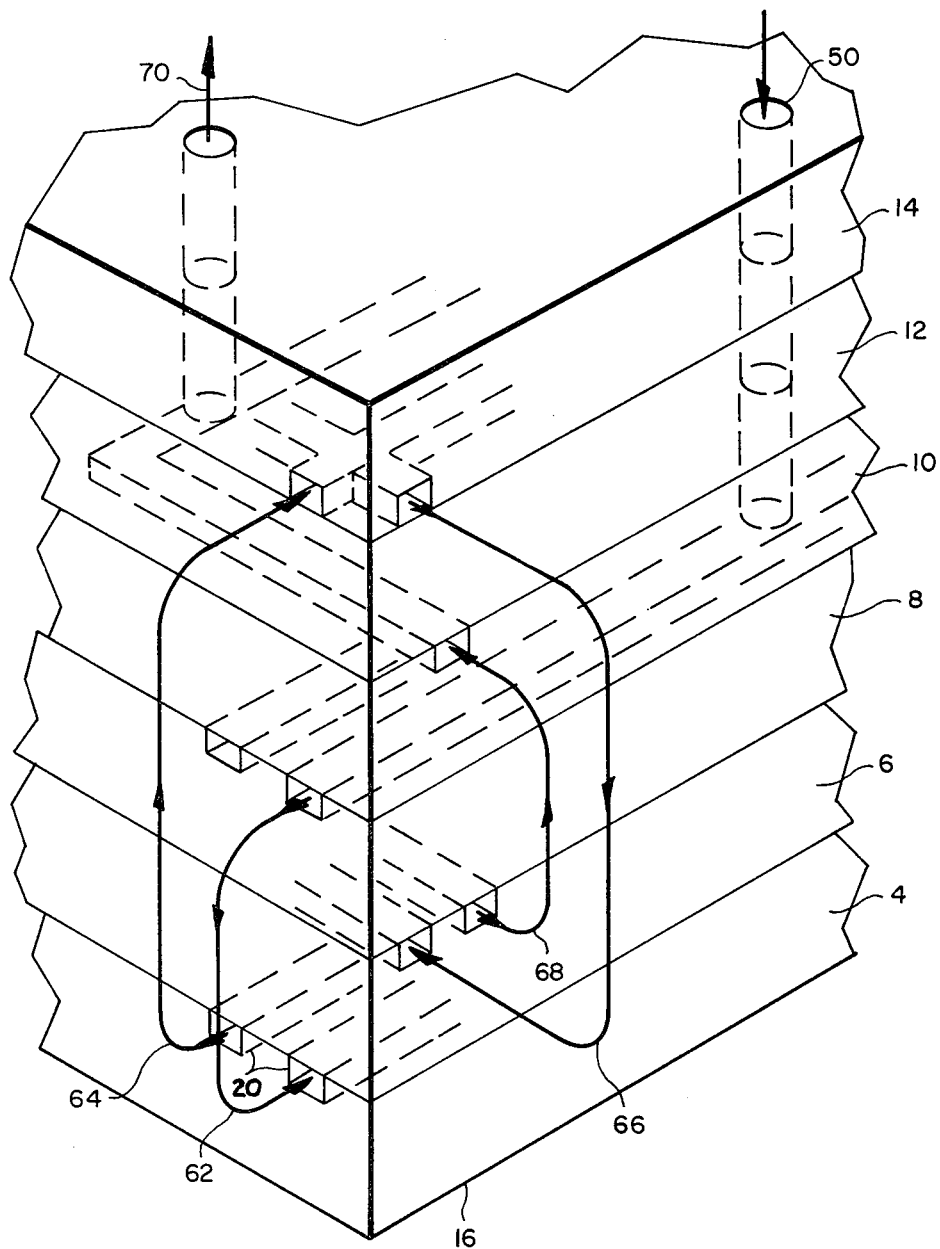
FIG. 2 is a diagrammatic representation illustrating the path of the coolant fluid through the mirror of FIG. 1.

FIG. 2 is a diagrammatic representation summarizing the flow of coolant fluid through the structure of the mirror 2. Thus, coolant fluid is supplied through the inlet openings 50 to plate 8 where the coolant fluid is distributed by grooves 28 and the grooves of groups 30 and 32 to establish a minimum temperature plane parallel to the reflective surface 16. Next, the coolant fluid is delivered to the grooves 20 of plate 4, as indicated by arrow 62 in FIG. 2, and makes a single pass across plate 4 in heat exchanging relation with the reflective surface 16. Thereafter, the coolant fluid from the grooves 20 at each end of plate 4 is delivered as indicated by arrow 64 in FIG. 2, to an appropriate one of the grooves 44 or 46 of plate 14. Thus, the coolant fluid from the grooves of group 30 of plate 8 is delivered to the upper ends of alternate ones of the grooves 20 of plate 4, makes a single pass in heat exchanging relation with the reflective surface 16 to the lower edge of plate 4 and, then is delivered to groove 46 in plate 14. Similarly, the coolant fluid from the grooves of group 32 of plate 8 is delivered to the lower ends of the intermediate grooves 20 of plate 4, makes a single pass in heat exchanging relation with the reflective surface 16 to the upper edge of plate 4 and, then, is delivered to groove 44 in plate 14. All of the fluid delivered by the grooves 20 to the respective edges of plate 4 is mixed in either groove 44 or 46 of plate 14. Consequently, the grooves 44 and 46 serve, effectively, to integrate the thermal load applied across the reflective surface 16 and to deliver fluid at substantially uniform temperature to respective sides of plate 6, as indicated by arrow 66 in FIG. 2. This uniformly heated fluid makes a single pass through grooves 24 of plate 6 in a direction perpendicular to that of the grooves 20 of plate 4 and, thence, establishes a uniform temperature plane parallel to the reflective surface 16 between the reflective surface 16 and the minimum temperature plane defined by the flow of coolant fluid through plate 8. The location of the uniform temperature plane and the relative directions of the coolant fluid flow through grooves 20 of plate 4 and grooves 24 of plate 6 tends to disperse and compensate for localized heating of the reflective surface 16, such as might occur from uneven optical load distribution, and prevents thermal distortion of the mirror 2 which might result from such localized heating. From the respective sides of plate 6, the fluid is delivered to plate 10, as indicated by arrow 68 in FIG. 2, where it is collected by the grooves of groups 40 and 42 and is exhausted through grooves 36 of plate 6 and the outlet openings 52 of plates 12 and 14, as indicated by arrow 70 in FIG. 2.

Obviously, if desired, the openings 58 and 60 could be replaced by recesses corresponding to the recesses 54 and 56 and vice versa. Moreover, the grooves 20 of plate 4 could, if desired, be made to extend horizontally across plate 4, provided the grooves 24 are made to extend vertically across plate 6, etc. In addition, numerous other variations and modifications may obviously be made without departing from the present invention. Accordingly, it should be clearly understood that the form of the present invention described above and shown in the accompanying drawing is illustrative only and is not intended to limit the scope of the invention.

What is claimed is:

1. A thermally compensated mirror comprising:

a laminated structure formed by a front plate having a reflective front surface and having a plurality of grooves formed in the rear surface for conducting coolant fluid in heat exchanging relation with said reflective surface, a rear plate, a minimum temperature plate interposed between said front and rear plates and formed with a plurality of coolant distribution passageways coupled to receive coolant fluid before said coolant fluid has been passed to said front plate and oriented to distribute coolant fluid in a manner to establish a minimum temperature plane parallel to said reflective surface, a temperature stabilization plate interposed between said front plate and said minimum temperature plate and formed with a plurality of coolant distribution channels coupled to receive coolant fluid after said coolant fluid has passed in heat exchanging relation with said reflective surface and oriented to distribute said coolant fluid in a manner to establish a uniform temperature plane parallel to said reflective surface, and means for circulating said coolant fluid through said structure.

2. The mirror of claim 1 wherein:

the coolant distribution channels in said temperature stabilization plate extend perpendicular to said grooves in said front plate.

3. The mirror of claim 1 wherein:

the coolant distribution passageways in said minimum temperature plate extend parallel to said grooves in said front plate.

4. The mirror of claim 1 further comprising:

means for collecting and mixing the coolant fluid after said coolant fluid has passed through said grooves in said first plate.

* * * * *